United States Patent
Harris

[15] 3,649,235
[45] Mar. 14, 1972

[54] APPARATUS FOR DISSIPATING FOAM ON MOLTEN GLASS

[72] Inventor: Jesse L. Harris, Anderson, S.C.
[73] Assignee: Owens-Corning Fiberglas Corporation
[22] Filed: Jan. 15, 1970
[21] Appl. No.: 3,124

[52] U.S. Cl. ..................................65/11 R, 55/87, 55/178, 65/29, 65/158, 159/DIG. 4, 252/361
[51] Int. Cl. ........................................C03b 37/02
[58] Field of Search..........................252/361; 55/178, 87; 159/DIG. 4; 65/2, 11, 29, 158, 162

[56] References Cited

UNITED STATES PATENTS

| | | | |
|---|---|---|---|
| 3,238,144 | 3/1966 | Fortman | 252/361 |
| 3,298,615 | 1/1967 | Echols | 55/178 X |
| 3,380,463 | 4/1968 | Trethewey | 73/302 X |
| 3,427,252 | 2/1969 | Gaughan et al. | 252/361 |

Primary Examiner—S. Leon Bashore
Assistant Examiner—Robert L. Lindsay, Jr.
Attorney—Staelin & Overman and Oliver E. Todd, Jr.

[57] ABSTRACT

A method and apparatus for dissipating foam from the surface of a pool of molten material, such as glass. A pulse of compressed gas is periodically directed at the surface of the pool of molten material. The pulse of gas is periodically supplied at a frequency rate, at a pressure and for a time interval sufficient to keep the surface substantially free of foam. The gas is supplied through a valve that may be periodically opened and closed. This invention may be used in conjunction with a bubble-type depth gauge.

4 Claims, 1 Drawing Figure

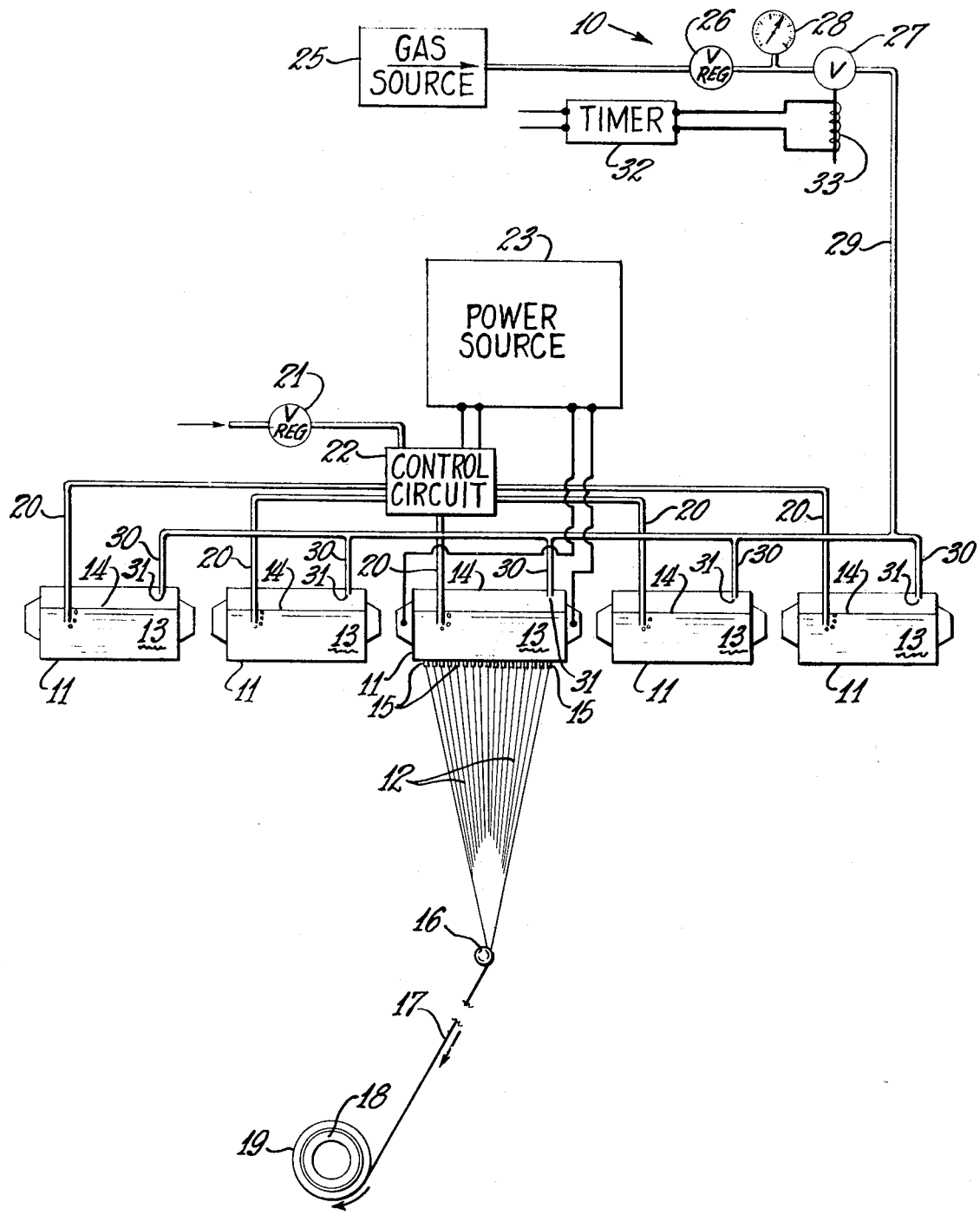

APPARATUS FOR DISSIPATING FOAM ON MOLTEN GLASS

BACKGROUND OF THE INVENTION

This invention relates to glass making and more particularly to a method and apparatus for dissipating foam from the surface of a pool of molten glass.

In certain instances, foam on the surface of a pool of molten material is a source of trouble, particularly when a small surface area permits a rapid buildup of foam. One instance when foam is a source of trouble is when the surface level of the pool must be continuously and accurately sensed. For example, in manufacturing glass filamentary products, especially yarns, strands, rovings, and the like, it is imperative that strict control be exercised to maintain exact filament uniformity. The physical and structural characteristics of glass filaments produced by conventional orificed feeders depend largely on the condition of the molten glass within the feeder. Thus, accurate control over glass viscosity, temperature and head has been recognized to be an important factor in producing quality glass filaments. Since slight fluctuations of one or more glass conditions radically affect filament consistency, undesirable thermal gradients which result in viscosity changes and variations in glass pressure head must be avoided. This requires maintenance of a substantially constant or undeviating level of molten feeder glass, even though glass is continuously removed from the feeder. The tolerances within which glass level must be held can be appreciated by the fact that filaments generally on the order of twenty-two one hundred thousandths of an inch in diameter must be controlled within 1 percent in order to meet production standards. Difficulty in maintaining such finite control is naturally compounded by the continuous supply and removal nature of the glass feeder operation.

Various techniques are used for maintaining a constant feeder glass level. In one technique an electrical probe senses the level and issues a correlative signal which is used by liquid flow controllers as a basis for compensating level deviations from a preset value. Some probe circuits establish a control signal corresponding in magnitude to the glass level by employment of a probe in which a resistance varies in accordance with the depth at which the probe extends below the glass surface. Other circuits rely on multiple probes disposed at different elevations in the feeder to sense and provide control regulators with level information. Surface bubbles or foam resulting from air trapped in the glass composition sometimes causes these probes to react slowly to a level change or even to sense a false level and consequently issue a false control signal. In still another type of level sensor a hollow probe is submerged in the glass. Gas is continuously pumped through the probe and the back pressure of the gas, which depends upon the head of molten glass above the probe outlet, is sensed to produce a control signal. This type of level sensor may, however, produce excessive quantities of foam because gas is continuously bubbled through the molten glass. The foam is particularly troublesome because it is confined to a relatively small surface area in the feeder.

SUMMARY OF THE INVENTION

According to the instant invention, a method and apparatus are provided for dissipating foam from the surface of a pool of molten material, such as a pool of glass either in an orificed feeder for forming glass filaments or in other suitable reservoirs. A conduit or other suitable gas passage means is positioned above the glass surface in the feeder with an open end or outlet directed toward the glass surface. A source of compressed air or other gas, preferably at a pressure between 1 and 2 pounds per square inch gauge, is connected to the conduit through a normally closed solenoid actuated valve. At predetermined time intervals, a timer energizes the valve to apply a short pulse of the compressed air to the conduit. Air discharged from the open conduit end dissipates foam from the glass surface, allowing an accurate determination of the glass level in the feeder. When there are several feeders located in the same general area, a conduit may be positioned in each feeder with the conduits connected in parallel to a single valve. Opening the valve delivers an air pulse simultaneously to all conduits to dissipate foam from all of the feeders.

It is a primary object of the invention to provide a method and apparatus for dissipating foam from the surface of a pool of molten material.

Another object of the invention is to provide a method and apparatus for dissipating foam from the surface of a pool of molten glass in an orificed feeder for forming glass filaments to allow an accurate determination of glass level.

Other objects and advantages of the invention will become apparent from the following detailed description, reference being made to the accompanying drawings.

BRIEF DESCRIPTION OF THE DRAWING

The single drawing shows schematically a plurality of orificed feeders for forming glass filaments and including apparatus according to the instant invention for dissipating foam from the surface of molten glass in the feeders.

DESCRIPTION OF THE PREFERRED EMBODIMENT

Referring now to the single figure, apparatus 10 for dissipating foam from the surface of a pool of molten material is shown in combination with a plurality of orificed feeders or bushings 11, each for forming a plurality of filaments 12. Each feeder 11 is filled with a pool of molten heat softenable material 13, molten glass in this instance, having an upper surface 14. The material 13 flows from a plurality of dependent orificed tips 15 and is attenuated into the plurality of filaments 12. The filaments 12 are collected by a shoe 16 into a composite or strand 17 which is ultimately wound on a rotating tube 18 into a package 19.

Each feeder 11 is equipped with a conventional level sensor, in this case a gaseous purged probe 20. Gas is delivered at a constant pressure through a pressure regulator 21 and a control circuit 22 to each of the probes 20. Each probe 20 has an outlet below the surface 14 of the molten material 13. The control circuit 22 monitors the back pressure of the gas in each probe 20 for determining and controlling the level of the surface 14. If material is delivered to each bushing or feeder 11 at a constant rate, the control circuit 22 may be connected as shown to control power delivered from a power source 23 to each feeder 11. When the material surface 14 in any feeder 11 increases, the control circuit 22 increases the power delivered from the source 23 to that feeder 11. The temperature of the material 13 in the feeder 11 will then increase, causing a decrease in the viscosity of the material 13 and hence an increase in flow through the orificed tips 15. Conversely, the control circuit 22 decreases the rate of power delivered from the source 23 to any feeder 11 if the surface 14 drops below a desired level. It will be appreciated that the surface level 14 may also be maintained constant by holding the material 13 at a constant temperature and controlling the rate at which material is supplied to the feeder 11. In these arrangements problems sometimes occur in maintaining a constant surface level 14 due to excessive foam caused by the gaseous purged probes 20. The foam problem is aggrevated by the fact that the surface 14 typically has a relatively small area, which allows a rapid buildup of foam.

The apparatus 10 dissipates foam from the material surface 14 in each feeder 11 by periodically directing a pulse or blast of compressed air or gas at the surface 14 in each feeder 11. A source of compressed gas 25 is connected through a regulator 26 to a normally closed solenoid-actuated valve 27. The regulator 26 supplies a constant gas pressure to the valve 27, preferably a pressure of approximately 1 to 2 pounds per square inch gauge as indicated on a gauge 28. A pipe or conduit 29 connects the outlet of the valve 27 to a plurality of conduits 30, one for each feeder 11. Each conduit 30 has an open end 31 positioned above and directed toward the material surface 14 in a different one of the feeders 11. The open conduit end may, of course, include a nozzle (not shown). A conventional timer circuit 32, which may be either a mechanical timer or an electronic timer, controls the valve 27. The timer 32 periodically energizes a solenoid 33 for opening the valve 27 for a predetermined time interval. The timer 32 may, for example, open the valve 27 at time intervals ranging between one-half and 3 minutes and hold the valve 27 open for a time interval ranging between two and five seconds. Each time the valve 27 is opened, a pulse of gas is delivered from the source 25 simultaneously to all of the conduits 30 for dissipating foam from the surfaces 14 in each of the feeders 11.

It will be appreciated that the apparatus 10 for dissipating foam from the surface 14 of molten glass 13 may be used with devices other than the filament-forming feeders 11, where it is desired to dissipate foam from the surface of a pool of molten material.

I claim:

1. Apparatus for dissipating foam from the surface of a pool of molten glass comprising, in combination, control means for forming gas bubbles on the surface of the glass means providing a gas passage having an inlet and an outlet, means positioning said outlet above the glass surface, said outlet being directed toward the glass surface, a means for providing compressed gas, a normally closed valve connecting said gas providing means to said inlet, and means for periodically opening said valve for a predetermined time interval to pulse the gas at the surface.

2. Apparatus for dissipating foam from the surface of a pool of molten glass, as defined in claim 1, wherein said means for opening said valve has means to open said valve every one-half to 3 minutes and to hold said valve open for a time interval ranging between 2 and 5 seconds.

3. Apparatus for dissipating foam from the surfaces of pools of glass in a plurality of orificed feeders for forming glass filaments comprising, in combination, a plurality of gas passage means, each having an inlet and an outlet, means positioning a different one of said outlets above the surface of the pool of glass in each feeder with the outlet directed toward the surface, means for providing compressed gas, a normally closed valve having an inlet connected to said gas-providing means and an outlet, means connecting said valve outlet to said inlets of said plurality of gas passage means, and means for periodically opening said valve for a predetermined time interval to pulse the gas at the surface.

4. Apparatus for dissipating foam from the surface of pools of glass in a plurality of orificed feeders for forming glass filaments, as defined in claim 3, wherein said means for providing compressed gas is at a pressure between one and two pounds per square inch gauge, and wherein said valve opening means has means to open said valve at time intervals ranging between one-half and 3 minutes and to hold said valve open for a time interval ranging between 2 and 5 seconds.

* * * * *